(12) United States Patent
Li et al.

(10) Patent No.: US 11,763,714 B2
(45) Date of Patent: Sep. 19, 2023

(54) DISPLAY DEVICE HAVING DRIVING CHIP

(71) Applicant: SHENZHEN CHINA STAR OPTOELECTRONICS SEMICONDUCTOR DISPLAY TECHNOLOGY CO., LTD., Shenzhen (CN)

(72) Inventors: Zhisheng Li, Shenzhen (CN); Wenfang Li, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 59 days.

(21) Appl. No.: 17/600,067

(22) PCT Filed: Aug. 26, 2021

(86) PCT No.: PCT/CN2021/114634
§ 371 (c)(1),
(2) Date: Sep. 29, 2021

(87) PCT Pub. No.: WO2023/019620
PCT Pub. Date: Feb. 23, 2023

(65) Prior Publication Data
US 2023/0059909 A1 Feb. 23, 2023

(30) Foreign Application Priority Data
Aug. 19, 2021 (CN) ............... 202110953214.0

(51) Int. Cl.
G09G 3/3275 (2016.01)
G09G 3/20 (2006.01)

(52) U.S. Cl.
CPC ............. *G09G 3/20* (2013.01); *G09G 2300/04* (2013.01); *G09G 2300/08* (2013.01);
*G09G 2310/0202* (2013.01); *G09G 2320/02* (2013.01)

(58) Field of Classification Search
CPC ... G09G 3/20; G09G 2300/04; G09G 2300/08; G09G 2310/0202; G09G 2320/02; G02F 1/1345; G09G 2300/0426; G09G 3/3225; G09G 3/3275; G09G 3/3685; G09G 2310/0275; G09G 2330/02
See application file for complete search history.

(56) References Cited

U.S. PATENT DOCUMENTS

| 10,902,816 | B2* | 1/2021 | Liu ..................... G09G 3/20 |
| 2008/0111649 | A1* | 5/2008 | Ryu .................. G09G 3/3688 345/55 |
| 2008/0137016 | A1 | 6/2008 | Kim et al. |
| 2017/0098423 | A1* | 4/2017 | Tang ................ G09G 3/3688 |

(Continued)

FOREIGN PATENT DOCUMENTS

| CN | 105204248 A | 12/2015 |
| CN | 106990869 A | 7/2017 |
| CN | 208737865 U | 4/2019 |

(Continued)

*Primary Examiner* — Rodney Amadiz
(74) *Attorney, Agent, or Firm* — Hamre, Schumann, Mueller & Larson, P.C.

(57) ABSTRACT

The display device disclosed in the present application includes a driving chip, a plurality of fan-out lines electrically connected to the driving chip; and a plurality of data lines electrically connected to the plurality of fan-out lines in a one-to-one correspondence, wherein the driving chip includes a plurality of resistance modules, the plurality of resistance modules are electrically connected to the plurality of fan-out lines in a one-to-one correspondence, and the plurality of resistance module are configured to compensate different impedances of the fan-out lines.

17 Claims, 4 Drawing Sheets

(56) References Cited

U.S. PATENT DOCUMENTS

| | | | | |
|---|---|---|---|---|
| 2020/0098320 | A1* | 3/2020 | Huang | G09G 3/20 |
| 2021/0035521 | A1* | 2/2021 | Qiu | G09G 3/3275 |
| 2021/0104190 | A1* | 4/2021 | Liu | G09G 3/3275 |
| 2021/0358428 | A1* | 11/2021 | Liu | G09G 3/36 |

FOREIGN PATENT DOCUMENTS

| CN | 109976052 | A | 7/2019 |
|---|---|---|---|
| CN | 210325151 | U | 4/2020 |
| CN | 112201165 | A | 1/2021 |

* cited by examiner

US 11,763,714 B2

1

DISPLAY DEVICE HAVING DRIVING CHIP

FIELD OF INVENTION

The present application relates to a field of display technology, in particular to a display device.

BACKGROUND OF INVENTION

In a display device, a base substrate may include a display region and a non-display region, wherein the display region is provided with a plurality of data lines, and the non-display region is provided with a data driving chip and a plurality of fan-out lines connected to the plurality of data lines. Each of the fan-out lines provides display signals to the display region.

However, a difference in the relative positions of the plurality of fan-out lines and the data driving chip causes each of fan-out lines has a different length, which will cause uneven impedances of fan-out lines, which in turn causes uneven charging of the display device, and affects a display effect of the display device.

SUMMARY OF INVENTION

The present application provides a display device, which can improve an uneven charging of the display device, thereby improving the display effect of the display device In a first aspect, the present application provides a display device, includes
- a driving chip;
- a plurality of fan-out lines electrically connected to the driving chip; and
- a plurality of data lines electrically connected to the plurality of fan-out lines in a one-to-one correspondence;
- wherein the driving chip comprises a plurality of resistance modules, the plurality of resistance modules are electrically connected to the plurality of fan-out lines in a one-to-one correspondence, and the plurality of resistance modules are configured to compensate different impedances of the fan-out lines;
- each of the resistance modules comprises a plurality of resistance units arranged in parallel, and each of the resistance units comprises a compensation input terminal, a compensation output terminal, and a switch resistance pair, the switch resistance pair comprises a compensation resistor and a compensation switch, and the resistance unit is configured to connect the compensation resistor between the compensation input terminal and the compensation output terminal; and
- the driving chip further comprises a plurality of signal output modules, the plurality of signal output modules are electrically connected to the plurality of resistance modules in a one-to-one correspondence, and the signal output module is configured to output driving signals to the corresponding resistance modules.

In the display device provided by the present application, the switch resistance pair comprises a first compensation resistor and a first compensation switch, and the first compensation resistor and the first compensation switch are connected in series between the compensation input terminal and the compensation output terminal.

In the display device provided by the present application, the switch resistance pair comprises at least two second compensation resistors and one second compensation switch, the at least two second compensation resistors and the second compensation switch are connected in series between the compensation input terminal and the compensation output terminal.

In the display device provided by the present application, at least two of the second compensation resistors are connected in series, or at least two of the second compensation resistors are connected in parallel.

In the display device provided by the present application, the switch resistance pair comprises at least two third compensation resistors, at least two fourth compensation resistors, and one third compensation switch, and wherein the at least two third compensation resistors, the at least two fourth compensation resistors, and the third compensation switch are connected in series between the compensation input terminal and the compensation output terminal; and
wherein the at least two third compensation resistors are connected in parallel, the at least two fourth compensation resistors are connected in parallel.

In the display device provided by the present application, the switch resistance pair comprises a fifth compensation resistor, at least two sixth compensation resistors, and a fourth compensation switch, wherein the fifth compensation resistor, the at least two sixth compensation resistors, and the fourth compensation switch are connected in series between the compensation input terminal and the compensation output terminal, and wherein at least two of the sixth compensation resistors are connected in parallel.

In the display device provided by the present application, the switch resistance pair comprises at least two seventh compensation resistors, at least two eighth compensation resistors, and one fifth compensation switch, the at least two seventh compensation resistors, the at least two eighth compensation resistors, and the fifth compensation switch are connected in series between the compensation input terminal and the compensation output terminal; and
wherein the at least two seventh compensation resistors are connected in series, and the at least two eighth compensation resistors are connected in parallel.

In a second aspect, the present application provides a display device, including:
- a driving chip;
- a plurality of fan-out lines electrically connected to the driving chip; and
- a plurality of data lines electrically connected to the plurality of fan-out lines in a one-to-one correspondence;
- wherein the driving chip comprises a plurality of resistance modules, the plurality of resistance modules are electrically connected to the plurality of fan-out lines in a one-to-one correspondence, and the plurality of resistance modules are configured to compensate different impedances of the fan-out lines.

In the display device provided by the present application, each of the resistance modules comprises a plurality of resistance units arranged in parallel, and each of the resistance units comprises a compensation input terminal, a compensation output terminal, and a switch resistance pair, the switch resistance pair comprises a compensation resistor and a compensation switch, and the resistance unit is configured to connect the compensation resistor between the compensation input terminal and the compensation output terminal.

In the display device provided by the present application, the switch resistance pair comprises a first compensation resistor and a first compensation switch, and the first compensation resistor and the first compensation switch are connected in series between the compensation input terminal and the compensation output terminal.

In the display device provided by the present application, the switch resistance pair comprises at least two second compensation resistors and one second compensation switch, the at least two second compensation resistors and the second compensation switch are connected in series between the compensation input terminal and the compensation output terminal.

In the display device provided by the present application, at least two of the second compensation resistors are connected in series, or at least two of the second compensation resistors are connected in parallel.

In the display device provided by the present application, the switch resistance pair comprises at least two third compensation resistors, at least two fourth compensation resistors, and one third compensation switch, and wherein the at least two third compensation resistors, the at least two fourth compensation resistors, and the third compensation switch are connected in series between the compensation input terminal and the compensation output terminal; and wherein the at least two third compensation resistors are connected in parallel, the at least two fourth compensation resistors are connected in parallel.

In the display device provided by the present application, the switch resistance pair comprises a fifth compensation resistor, at least two sixth compensation resistors, and a fourth compensation switch, wherein the fifth compensation resistor, the at least two sixth compensation resistors, and the fourth compensation switch are connected in series between the compensation input terminal and the compensation output terminal, and wherein at least two of the sixth compensation resistors are connected in parallel.

In the display device provided by the present application, the switch resistance pair comprises at least two seventh compensation resistors, at least two eighth compensation resistors, and one fifth compensation switch, the least two seventh compensation resistors, the at least two eighth compensation resistors, and the fifth compensation switch are connected in series between the compensation input terminal and the compensation output terminal; and wherein the at least two seventh compensation resistors are connected in series, and the at least two eighth compensation resistors are connected in parallel.

In the display device provided by the present application, each of the compensation switches is a thin film transistor, and wherein a control terminal of each of the thin film transistors are controlled by different compensation signals.

In the display device provided by the present application, the driving chip further comprises a plurality of signal output modules, the plurality of signal output modules are electrically connected to the plurality of resistance modules in a one-to-one correspondence, and the signal output module is configured to output driving signals to the corresponding resistance modules.

In the display device provided by the present application, a plurality of resistance modules are provided in the driving chip to compensate the different impedances of the fan-out lines. That is, the resistance module compensates the impedance difference caused by the different length of the fan-out lines, so that an overall impedances tend to be equal, thereby improving an uneven charging of the display device and improving the display effect of the display device.

DESCRIPTION OF FIGURES

In order to explain the technical solutions in the embodiments of the present application more clearly, the following will briefly introduce the figures needed in the description of the embodiments. Obviously, the figures in the following description are only some embodiments of the present application. For those skilled in the art, without inventive steps, other figures can be obtained based on these figures.

DETAILED DESCRIPTION OF EMBODIMENTS

The technical solutions in the embodiments of the present application will be clearly and completely described below in conjunction with the figures in the embodiments of the present application. Obviously, the described embodiments are only a part of the embodiments of the present application, rather than all the embodiments. Based on the embodiments in the present application, all other embodiments obtained by those skilled in the art without inventive steps shall fall within a protection scope of the present application.

It should be understood that the specific embodiments described here are only used to illustrate and explain the present application, and are not used to limit the present application. The claims of the present application and the terms: first, second, third, fourth, fifth, sixth, seventh, and eighth. etc. in the specification are used to distinguish different objects, not to describe a specific order.

Figure 1:
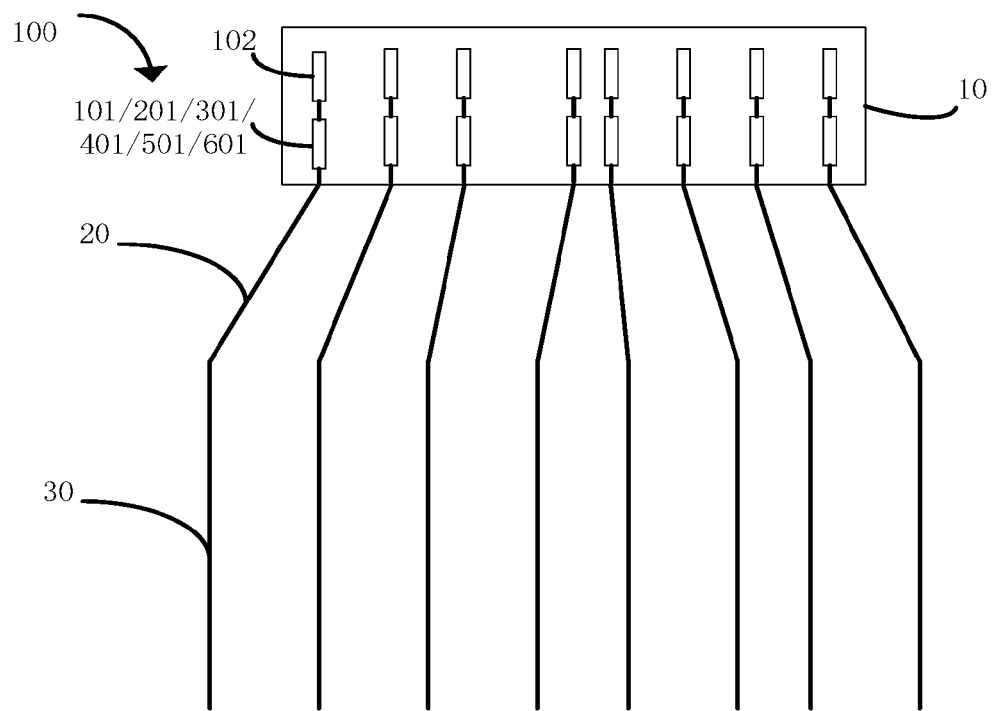
FIG. 1 is a schematic structural diagram of a display device provided by one embodiment of the present application.

Please refer to FIG. 1. FIG. 1 is a schematic structural diagram of a display device provided by one embodiment of the present application. As shown in FIG. 1, the display device 100 provided by the embodiment of the present application includes a driving chip 10, a plurality of fan-out lines 20, and a plurality of data lines 30. The plurality of fan-out lines 20 are electrically connected to the driving chip 10. The plurality of data lines 30 are electrically connected to the plurality of fan-out lines 20 in a one-to-one correspondence, wherein the driving chip 10 includes a plurality of resistance modules 101, the plurality of resistance modules 101 are electrically connected to the plurality of fan-out lines 20 in a one-to-one correspondence, and the plurality of resistance modules 101 are configured to compensate different impedances of the fan-out lines 20.

It should be noted that the display device 100 includes a display region and a non-display region, and the non-display region is provided with a circuit board connected with a driving chip. The plurality of fan-out lines 20 are provided between the driving chip 10 and the display region. Since the driving chip 10 is narrow and the display region is wider, it is necessary to connect the driving chip 10 with the corresponding data line 30 in the display region through the plurality of fan-out lines 20, which makes the plurality of fan-out lines 20 corresponding to the same driver chip 10, and lengths of the fan-out lines 20 corresponding to different positions are different, so that each of fan-out lines 20 has a different impedance.

Generally, a length of the fan-out line 20 positioned in a middle of the fan-out region is the shortest, while lengths of the fan-out lines 20 positioned on both sides of the fan-out region are gradually increases. A difference in length causes impedance difference between the fan-out lines 20, and the greater the length difference, the greater the impedance difference. Especially for a display device 100 designed with a high-pin-count driver chip 10, corresponding to the same driver chip 10 and one fan-out region, the length difference between the fan-out lines 20 is very large, which results in the impedance difference of each fan-out lines 20 is also very large.

In the display device 100 provided by the present application, a plurality of resistance modules 101 are provided in the driving chip 10 to compensate different impedances of the fan-out lines 20. That is, the plurality of resistance modules 101 compensate the impedance difference caused by the different lengths of the fan-out lines 20, so that an overall impedance tends to be equal, thereby improving the uneven charging of the display device 100 and improving the display effect of the display device 100.

The driving chip 10 further includes a plurality of signal output modules 102. The plurality of signal output modules 102 are electrically connected to the plurality of resistance modules 101 in a one-to-one correspondence, and the signal output module 102 is configured to output driving signals to the corresponding resistance modules 101.

Figure 2:
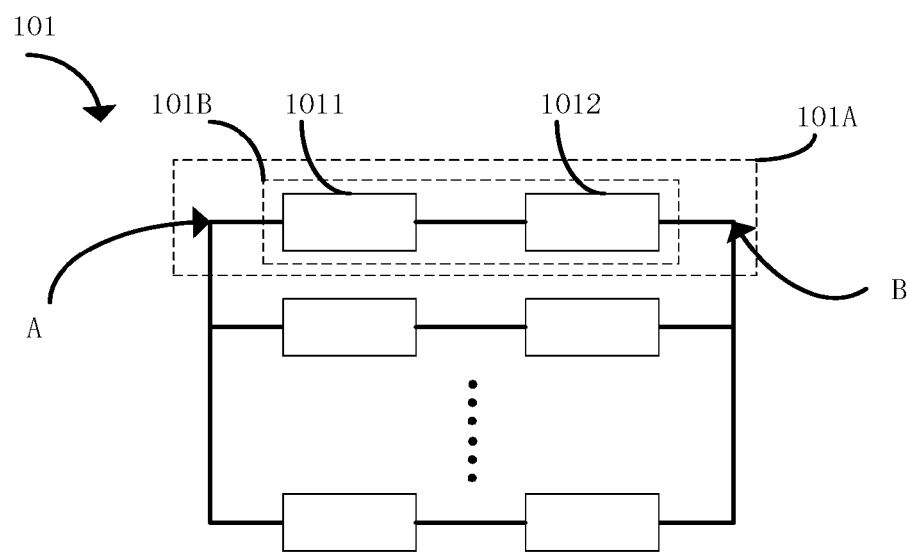
FIG. 2 is a schematic diagram of a first structure of a resistance module in the display device provided by one embodiment of the present application.

Please refer to FIG. 2. FIG. 2 is a schematic diagram of a first structure of the resistance module in the display device provided by one embodiment of the present application. As shown in FIG. 1 and FIG. 2, each of the resistance modules 101 includes a plurality of resistance units 101A arranged in parallel, and each of the resistance units 101A includes a compensation input terminal A, a compensation output terminal B, and a switch resistance pair 101B. The switch resistance pair 101B includes a compensation resistor and a compensation switch. The resistance unit 101A is configured to connect the compensation resistor between the compensation input terminal A and the compensation output terminal B.

The switch resistance pair 101B includes a first compensation resistor 1011 and a first compensation switch 1012, and the first compensation resistor 1011 and the first compensation switch 1012 are connected in series between the compensation input terminal A and the compensation output terminal B.

Each of the first compensation switches 1012 is a thin film transistor, wherein a control terminal of each of the thin film transistors are controlled by different compensation signals.

In the display device 100 provided in the present application, a plurality of switch resistance pairs 101B are provided in the driving chip 10 to compensate the different impedances of the fan-out lines 20. That is, the plurality of resistance module 101 compensate the impedance difference caused by the different lengths of the fan-out lines 20, so that an overall impedance tends to be equal, thereby improving the uneven charging and the display effect of the display device 100.

Figure 3:
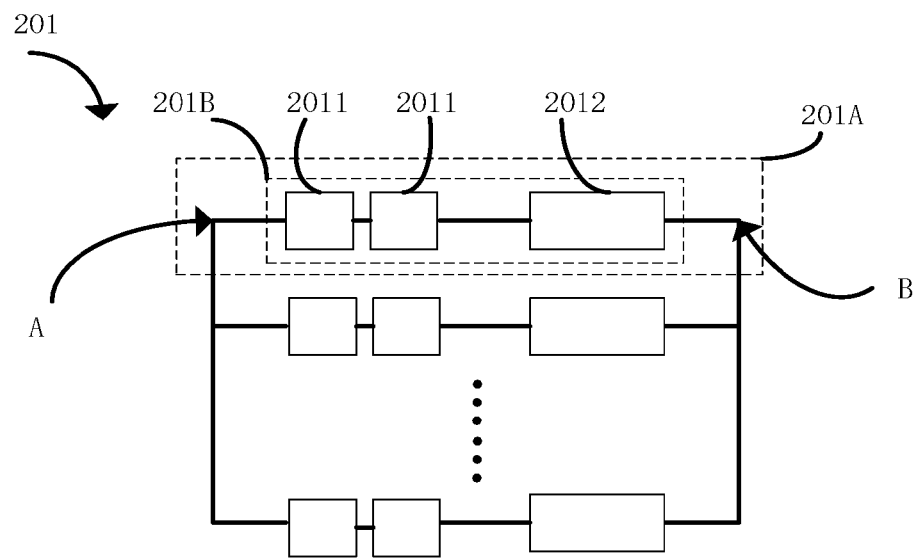
FIG. 3 is a schematic diagram of a second structure of the resistance module in the display device provided by one embodiment of the present application.

Please refer to FIG. 3, FIG. 3 is a schematic diagram of a second structure of the resistance module in the display device provided by one embodiment of the present application. As shown in FIGS. 1 and 3, each of the resistance modules 201 includes a plurality of resistance units 201A arranged in parallel, and each of the resistance units 201A includes a compensation input terminal A, a compensation output terminal B, and a switch resistance pair 201B. The switch resistance pair 201B includes a compensation resistor and a compensation switch, and the resistance unit 201A is configured to connect the compensation resistor between the compensation input terminal A and the compensation output terminal B.

The switch resistance pair 201B includes at least two second compensation resistors 2011 and one second compensation switch 2012, the at least two second compensation resistors 2011 and the second compensation switch 2012 are connected in series between the compensation input terminal A and the compensation output terminal B, wherein the at least two second compensation resistors 2011 are connected in series.

Each of the second compensation switch 2012 is a thin film transistor, wherein a control terminal of each of the thin film transistors are controlled by different compensation signals.

In the display device 100 provided in the present application, a plurality of switch resistance pairs 201B are provided in the driving chip 10 to compensate the different impedances of the fan-out lines 20. That is, the plurality of switch resistance pairs 201B compensate the impedance difference caused by the different lengths of the fan-out lines 20, so that an overall impedance tends to be equal, thereby improving the uneven charging and the display effect of the display device 100.

Figure 4:
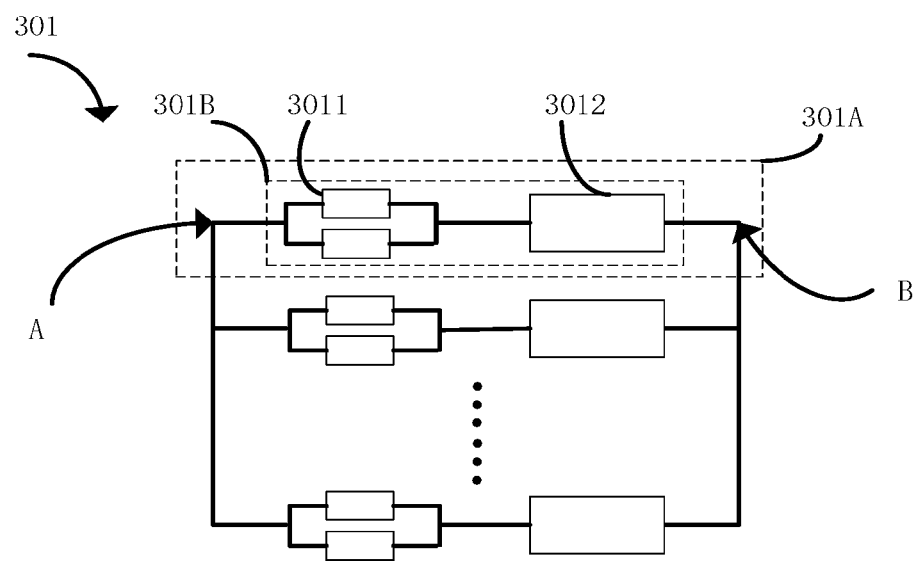
FIG. 4 is a schematic diagram of a third structure of the resistance module in the display device provided by one embodiment of the present application.

Please refer to FIG. 4. FIG. 4 is a schematic diagram of a third structure of the resistance module in the display device according to one embodiment of the present application. As shown in FIGS. 1 and 4, each of the resistance modules 301 includes a plurality of resistance units 301A arranged in parallel. Each of the resistance units 301A includes a compensation input terminal A, a compensation output terminal B, and a switch resistance pair 301B. The switch resistance pair 301B includes a compensation resistor and a compensation switch. The resistance unit 301A is configured to connect the compensation resistor between the compensation input terminal A and the compensation output terminal B.

The switch resistance pair 301B includes at least two second compensation resistors 3011 and one second compensation switch 3012. At least two second compensation resistors 3011 and the second compensation switch 3012 are connected in series between the compensation input terminal A and the compensation output terminal B, wherein the at least two second compensation resistors 3011 are connected in parallel.

Each of the second compensation switch 3012 is a thin film transistor, wherein a control terminal of each of the thin film transistors are controlled by different compensation signals.

In the display device 100 provided in the present application, a plurality of switch resistance pairs 301B are provided in the driving chip 10 to compensate the different impedances of the fan-out lines 20. That is, the plurality of switch resistance pairs 301B compensate the impedance difference caused by the different lengths of the fan-out lines 20, so that an overall impedance tends to be equal, thereby improving the uneven charging and the display effect of the display device 100.

Figure 5:
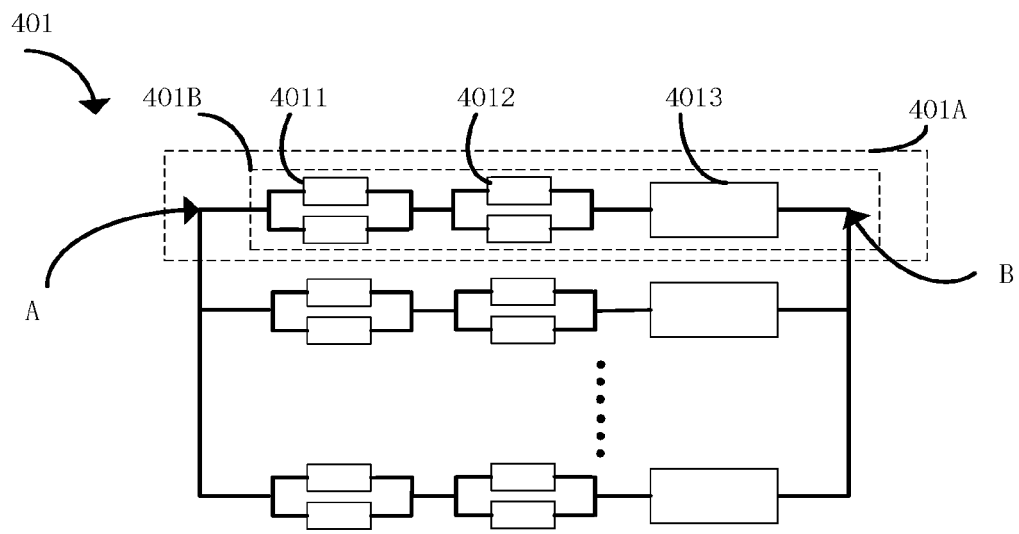
FIG. 5 is a schematic diagram of a fourth structure of the resistance module in the display device provided by one embodiment of the present application.

Please refer to FIG. 5. FIG. 5 is a schematic diagram of a fourth structure of the resistance module in the display device according to one embodiment of the present application. As shown in FIGS. 1 and 5, each of the resistance modules 401 includes a plurality of resistance units 401A arranged in parallel, and each of the resistance units 401A includes a compensation input terminal A, a compensation output terminal B, and a switch resistance pair 401B. The switch resistance pair 401B includes a compensation resistor and a compensation switch. The resistance unit 401A is configured to connect the compensation resistor between the compensation input terminal A and the compensation output terminal B.

The switch resistance pair 401B includes at least two third compensation resistors 4011, at least two fourth compensation resistors 4012, and one third compensation switch 4013, and wherein the at least two third compensation resistors 4011, the at least two fourth compensation resistors 4012, and the third compensation switch 4013 are connected in series between the compensation input terminal A and the compensation output terminal B, wherein at least two third compensation resistors 4011 are connected in parallel, and at least two fourth compensation resistors 4012 are connected in parallel.

Each of the third compensation switch 4013 is a thin film transistor, wherein a control terminal of each of the thin film transistors are controlled by different compensation signals.

In the display device 100 provided in the present application, a plurality of switch resistance pairs 401B are provided in the driving chip 10 to compensate the different impedances of the fan-out lines 20. That is, the plurality of switch resistance pairs 401B compensate the impedance difference caused by the different lengths of the fan-out lines 20, so that an overall impedance tends to be equal, thereby improving the uneven charging and the display effect of the display device 100.

Figure 6:
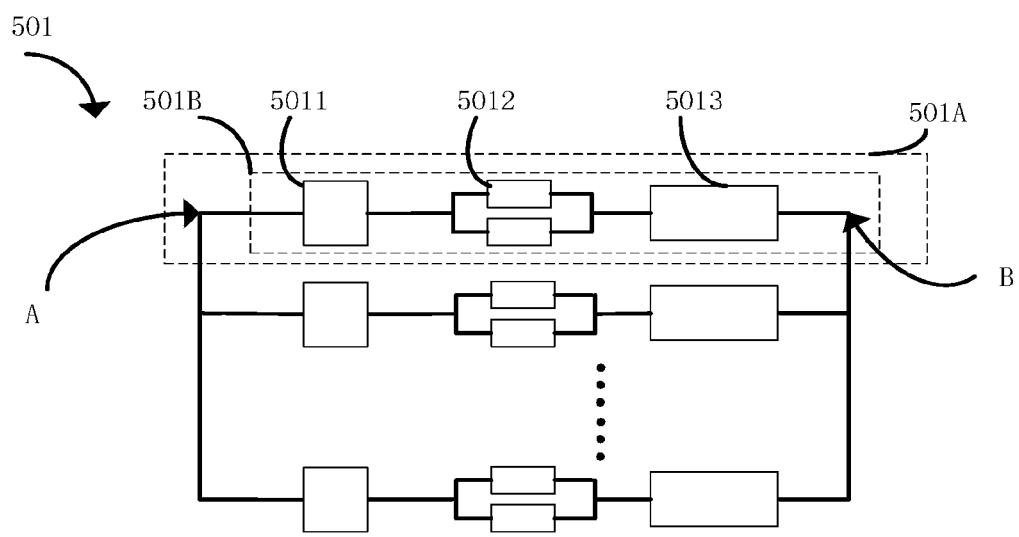
FIG. 6 is a schematic diagram of a fifth structure of the resistance module in the display device provided by one embodiment of the present application.

Please refer to FIG. 6. FIG. 6 is a schematic diagram of a fifth structure of the resistance module in the display device according to one embodiment of the present application. As shown in FIG. 1 and FIG. 6, each of the resistance module 501 includes a plurality of resistance units 501A arranged in parallel, and each of the resistance units 501A includes a compensation input terminal A, a compensation output terminal B, and a switch resistance pair 501B. The switch resistance pair 501B includes a compensation resistor and a compensation switch. The resistance unit 501A is configured to connect the compensation resistor between the compensation input terminal A and the compensation output terminal B.

The switch resistance pair 501B includes a fifth compensation resistor 5011, at least two sixth compensation resistors 5012, and a fourth compensation switch 5013, wherein the fifth compensation resistor 5011, the at least two sixth compensation resistors 5012, and the fourth compensation switch 5013 are connected in series between the compensation input terminal A and the compensation output terminal B, and wherein at least two of the sixth compensation resistors 5012 are connected in parallel.

Each of the fourth compensation switch 5013 is a thin film transistor, wherein a control terminal of each of the thin film transistors are controlled by different compensation signals.

In the display device provided by the present application, a plurality of switch resistance pairs are provided in the driving chip to compensate the different impedances of the fan-out lines. That is, the plurality of switch resistance pairs compensate the impedance difference caused by the different lengths of the fan-out lines, so that an overall impedance tends to be equal, thereby improving the uneven charging and the display effect of the display device.

Figure 7:
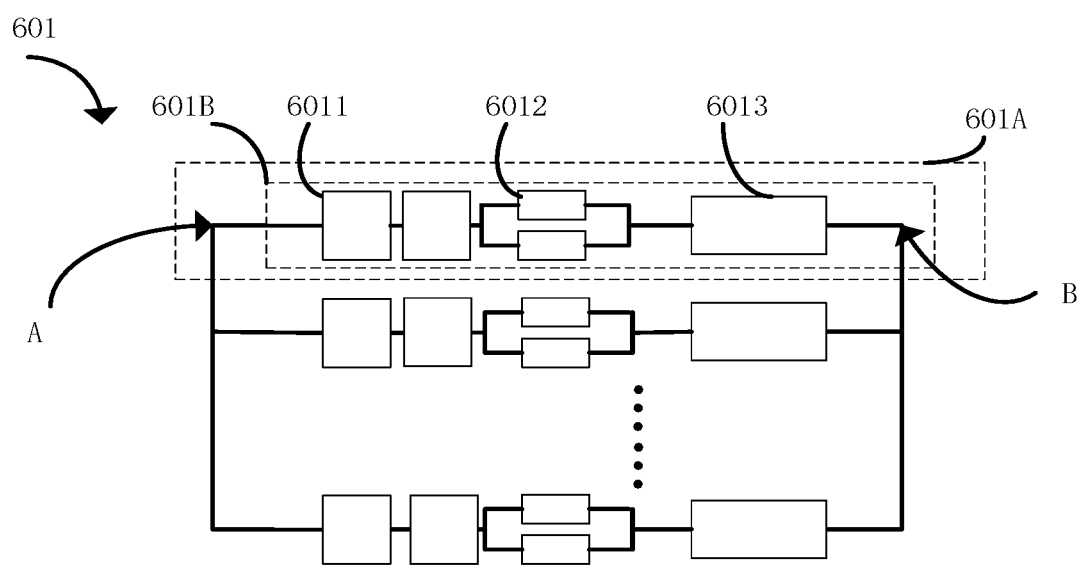
FIG. 7 is a schematic diagram of a sixth structure of the resistance module in the display device provided by one embodiment of the present application.

Please refer to FIG. 7. FIG. 7 is a schematic diagram of a sixth structure of the resistance module in the display device provided by one embodiment of the present application. As shown in FIG. 1 and FIG. 7, each of the resistance module 601 includes a plurality of resistance units 601A arranged in parallel, and each of the resistance units 601A includes a compensation input terminal A, a compensation output terminal B, and a switch resistance pair 601B. The switch resistance pair 601B includes a compensation resistor and a compensation switch. The resistance unit 601A is configured to connect the compensation resistor between the compensation input terminal A and the compensation output terminal B.

The switch resistance pair 601B includes at least two seventh compensation resistors 6011, at least two eighth compensation resistors 6012, and one fifth compensation switch 6013, the at least two seventh compensation resistors 6011, the at least two eighth compensation resistors 6012, and the fifth compensation switch 6013 are connected in series between the compensation input terminal A and the compensation output terminal B. and wherein the at least two seventh compensation resistors 6011 are connected in series, and at least two eighth compensation resistors 6012 are connected in parallel.

Each of the fifth compensation switch 6013 is a thin film transistor, wherein a control terminal of each of the thin film transistors are controlled by different compensation signals.

In the display device 100 provided in the present application, a plurality of switch resistance pairs 601B are provided in the driving chip 10 to compensate the different impedances of the fan-out lines 20. That is, the plurality of switch resistance pairs 601B compensate the impedance difference caused by the different lengths of the fan-out lines 20, so that an overall impedance tends to be equal, thereby improving the uneven charging and the display effect of the display device 100.

The above is a detailed introduction to the display provided by the embodiments of the present application. Specific embodiments are used in the specification to illustrate the principles and implementation of the present application. The descriptions of the above embodiments are only used to help understand the methods and core ideas of the present application. At the same time, for those skilled in the art, according to the idea of the present application, there will be changes in the specific implementation and the scope of application. In summary, the content of this specification should not be construed as a limitation to the present application.

What is claimed is:
1. A display device, comprising:
a driving chip;
a plurality of fan-out lines electrically connected to the driving chip; and
a plurality of data lines electrically connected to the plurality of fan-out lines in a one-to-one correspondence;
wherein the driving chip comprises a plurality of resistance modules, the plurality of resistance modules are electrically connected to the plurality of fan-out lines in a one-to-one correspondence, and the plurality of resistance modules are configured to compensate different impedances of the fan-out lines;
each of the resistance modules comprises a plurality of resistance units arranged in parallel, and each of the resistance units comprises a compensation input terminal, a compensation output terminal, and a switch resistance pair, the switch resistance pair comprises a compensation resistor and a compensation switch, and the resistance unit is configured to connect the compensation resistor between the compensation input terminal and the compensation output terminal; and the driving chip further comprises a plurality of signal output modules, the plurality of signal output modules are electrically connected to the plurality of resistance modules in a one-to-one correspondence, and the signal output module is configured to output driving signals to the corresponding resistance modules.

2. The display device according to claim 1, wherein the switch resistance pair comprises a first compensation resistor and a first compensation switch, and the first compensation resistor and the first compensation switch are connected in series between the compensation input terminal and the compensation output terminal.

3. The display device according to claim 1, wherein the switch resistance pair comprises at least two second compensation resistors and one second compensation switch, the at least two second compensation resistors and the second compensation switch are connected in series between the compensation input terminal and the compensation output terminal.

4. The display device according to claim 3, wherein at least two of the second compensation resistors are connected in series, or at least two of the second compensation resistors are connected in parallel.

5. The display device according to claim 1, wherein the switch resistance pair comprises at least two third compensation resistors, at least two fourth compensation resistors, and one third compensation switch, and wherein the at least two third compensation resistors, the at least two fourth compensation resistors, and the third compensation switch are connected in series between the compensation input terminal and the compensation output terminal; and wherein the at least two third compensation resistors are connected in parallel, the at least two fourth compensation resistors are connected in parallel.

6. The display device according to claim 1, wherein the switch resistance pair comprises a fifth compensation resistor, at least two sixth compensation resistors, and a fourth compensation switch, wherein the fifth compensation resistor, the at least two sixth compensation resistors, and the fourth compensation switch are connected in series between the compensation input terminal and the compensation output terminal, and wherein at least two of the sixth compensation resistors are connected in parallel.

7. The display device according to claim 1, wherein the switch resistance pair comprises at least two seventh compensation resistors, at least two eighth compensation resistors, and one fifth compensation switch, the at least two seventh compensation resistors, the at least two eighth compensation resistors, and the fifth compensation switch are connected in series between the compensation input terminal and the compensation output terminal; and wherein the at least two seventh compensation resistors are connected in series, and the at least two eighth compensation resistors are connected in parallel.

8. The display device according to claim 1, wherein each of the compensation switches is a thin film transistor, and wherein a control terminal of each of the thin film transistors are controlled by different compensation signals.

9. A display device, comprising
a driving chip;
a plurality of fan-out lines electrically connected to the driving chip; and
a plurality of data lines electrically connected to the plurality of fan-out lines in a one-to-one correspondence;
wherein the driving chip comprises a plurality of resistance modules, the plurality of resistance modules are electrically connected to the plurality of fan-out lines in a one-to-one correspondence, and the plurality of resistance modules are configured to compensate different impedances of the fan-out lines; and each of the resistance modules comprises a plurality of resistance units arranged in parallel, and each of the resistance units comprises a compensation input terminal, a compensation output terminal, and a switch resistance pair, the switch resistance pair comprises a compensation resistor and a compensation switch, and the resistance unit is configured to connect the compensation resistor between the compensation input terminal and the compensation output terminal.

10. The display device according to claim 9, wherein the switch resistance pair comprises a first compensation resistor and a first compensation switch, and the first compensation resistor and the first compensation switch are connected in series between the compensation input terminal and the compensation output terminal.

11. The display device according to claim 9, wherein the switch resistance pair comprises at least two second compensation resistors and one second compensation switch, the at least two second compensation resistors and the second compensation switch are connected in series between the compensation input terminal and the compensation output terminal.

12. The display device according to claim 11, wherein at least two of the second compensation resistors are connected in series, or at least two of the second compensation resistors are connected in parallel.

13. The display device according to claim 9, wherein the switch resistance pair comprises at least two third compensation resistors, at least two fourth compensation resistors, and one third compensation switch, and wherein the at least two third compensation resistors, the at least two fourth compensation resistors, and the third compensation switch are connected in series between the compensation input terminal and the compensation output terminal; and wherein the at least two third compensation resistors are connected in parallel, the at least two fourth compensation resistors are connected in parallel.

14. The display device according to claim 9, wherein the switch resistance pair comprises a fifth compensation resistor, at least two sixth compensation resistors, and a fourth compensation switch, wherein the fifth compensation resistor, the at least two sixth compensation resistors, and the fourth compensation switch are connected in series between the compensation input terminal and the compensation output terminal, and wherein at least two of the sixth compensation resistors are connected in parallel.

15. The display device according to claim 9, wherein the switch resistance pair comprises at least two seventh compensation resistors, at least two eighth compensation resistors, and one fifth compensation switch, the least two seventh compensation resistors, the at least two eighth compensation resistors, and the fifth compensation switch are connected in series between the compensation input terminal and the compensation output terminal; and wherein the at least two seventh compensation resistors are connected in series, and the at least two eighth compensation resistors are connected in parallel.

16. The display device according to claim 9, wherein each of the compensation switches is a thin film transistor, and wherein a control terminal of each of the thin film transistors are controlled by different compensation signals.

17. The display device according to claim 9, wherein the driving chip further comprises a plurality of signal output modules, the plurality of signal output modules are electrically connected to the plurality of resistance modules in a one-to-one correspondence, and the signal output module is configured to output driving signals to the corresponding resistance modules.

\* \* \* \* \*